United States Patent [19]
Honkanen et al.

[11] Patent Number: 5,160,523
[45] Date of Patent: Nov. 3, 1992

[54] METHOD OF PRODUCING OPTICAL WAVEGUIDES BY AN ION EXCHANGE TECHNIQUE ON A GLASS SUBSTRATE

[75] Inventors: Seppo Honkanen, Vantaa; Ari Tervonen, Espoo, both of Finland

[73] Assignee: Oy Nokia AB, Helsinki, Finland

[21] Appl. No.: 713,422

[22] Filed: Jun. 10, 1991

[30] Foreign Application Priority Data

Jul. 10, 1990 [FI] Finland ............... 903487

[51] Int. Cl.[5] .................................... C03C 21/00
[52] U.S. Cl. .................... 65/30.13; 65/3.14; 65/31; 385/132
[58] Field of Search ........... 65/3.14, 30.13, 31; 385/129, 130, 132

[56] References Cited

U.S. PATENT DOCUMENTS

| | | | |
|---|---|---|---|
| 3,857,689 | 12/1974 | Koizumi | 65/30.13 |
| 4,110,093 | 8/1978 | Macedo | 65/30.13 |
| 4,756,734 | 7/1988 | Kersten et al. | 65/30.1 |
| 4,765,819 | 8/1988 | Kersten | 65/30.1 |
| 4,842,629 | 6/1989 | Clemens et al. | 65/30.13 |
| 4,913,717 | 4/1990 | Cooper | 65/30.13 |
| 5,035,734 | 7/1991 | Honkanen | 65/30.13 |

FOREIGN PATENT DOCUMENTS

| | | |
|---|---|---|
| 0261672 | 3/1988 | European Pat. Off. |
| 0102203 | 6/1983 | Japan ............... 65/3.14 |
| 0136007 | 8/1983 | Japan ............... 65/3.14 |
| 0188906 | 9/1985 | Japan. |
| 2113006 | 7/1983 | United Kingdom. |

OTHER PUBLICATIONS

Refractive Index Changes Produced in Glass by Ion Exchange, French et al., 1970, Ceramic Bulletin, pp. 974–977.

Optics Letters, vol. 15, No. 4, Feb. 15, 1990, pp. 212–214: P. C. Noutsios et al.: "Shallow Buried Waveguides ... Glass".

Applied Optics, vol. 29, No. 18, Jun. 20, 1990, pp. 2798–2804: J. Albert et al.: "Full Modeling of Field ... Waveguides".

Primary Examiner—Robert L. Lindsay
Attorney, Agent, or Firm—Ladas & Parry

[57] ABSTRACT

The invention relates to a method of producing waveguides by an ion exchange technique on a glass substrate. In order to be able to alleviate the tolerances allowed for the ion exchange technique, the waveguides are formed in the invention by diffusing ions which increase the refractive index away from a waveguide formed previously on the glass substrate and being wider than the optical waveguides to be produced, by using the ion exchange technique and a positive-type ion exchange mask.

5 Claims, 1 Drawing Sheet

METHOD OF PRODUCING OPTICAL WAVEGUIDES BY AN ION EXCHANGE TECHNIQUE ON A GLASS SUBSTRATE

FIELD OF THE INVENTION

The invention relates to a method of producing optical waveguides by an ion exchange technique on a glass substrate.

BACKGROUND OF THE INVENTION

Interest in the use of ion-exchanged glass waveguides for passive integrated optics has increased considerably recently. Typical examples of such components and devices are single-mode 1/N power dividers and wavelength selective directional couplers. Since the operation of optical glass waveguides is purely passive, and does not allow adjustment after production, accurate control of production parameters is needed to obtain the desired waveguide reproducibility. This is especially important in the case of directional couplers, in which an accurate control of the propagation constant difference between symmetrical and asymmetrical modes is necessary. To produce optical fiber compatible waveguides by an ion exchange technique, two-step processes are generally used. In these processes, waveguides are formed by the exchange of the original ions in the glass (typically sodium ions $Na^+$) to ions increasing the refractive index (such as $K^+$, $Ag^+$, $Cs^+$, $Rb^+$, $Li^+$ or $Tl^+$ ions) through a narrow opening in the ion exchange mask, and by using salt melts or a silver film as an ion source. In the second step, thermal treatment or ion exchange in an $NaNO_3$ melt modifies the refractive index profile of the waveguide to obtain better coupling to optical fiber. As the diffusion during the second step increases the width of waveguides, narrow ($\approx 2$–$4$ $\mu m$) mask openings must be used in the first step. The number of exchanged ions is very sensitive to the mask opening width, wherefore there is a marked need of a new production method which allows a wider range of variation for the mask opening width. As to the basic principles of the ion exchange technique, the following article is referred to:

*Ion-Exchanged Glass Waveguides: A Review*, R. V. Ramaswamy, Journal of Lightwave Technology, Vol. 6, No. 6, Jun. 1988, p. 984.

SUMMARY OF THE INVENTION

The object of the invention is to provide a method which reduces the sensitivity of the optical waveguide production process to variation in the width of mask lines or mask openings.

This is achieved by means of a method of the invention for the production of optical waveguides by an ion exchange technique on a glass substrate, wherein the waveguides are formed by diffusing ions increasing the refractive index away from a waveguide which has been formed previously on the glass substrate and which is wider than the optical waveguides to be produced by using the ion exchange technique and a positive-type ion exchange mask. In the first step of the method, a planar optical waveguide, which is not limited in the sideward direction, i.e. is wider than the final optical waveguide to be formed, is formed on the glass substrate by the ion exchange technique. In the second step, a narrow ion exchange mask film is formed on the glass, whereafter the ion exchange is carried out by diffusing ions increasing the refractive index of the planar waveguide out of the glass in regions where there is no ion exchange mask. A desired sidewardly limited light channel, i.e. a light channel narrower than the planar waveguide, is formed on the glass substrate at places where the ion exchange mask prevents diffusion out of the glass.

A special feature of the method of the invention is that the light channel is not formed until during the second step of the two-step ion exchange process. As a result, the diffusion taking place during the formation of the light channel makes the light channel narrower instead of widening it as in prior art ion exchange techniques. As a consequence, the tolerances allowed for the width of the mask openings and lines in the thin-film mask technique can be considerably alleviated. For example, the width of single-mode diffusion mask openings used in conventional ion exchange technique is about 2 to 4 $\mu m$ whereas corresponding single-mode channels are achieved with line widths of about 8 to 10 $\mu m$ by means of the method of the invention.

BRIEF DESCRIPTION OF THE DRAWINGS

The invention will now be described in greater detail by means of an embodiment with reference to the attached drawing, in which.

DETAILED DESCRIPTION OF THE INVENTION

In the method of the invention for the production of waveguides by an ion exchange technique on a glass substrate, waveguides are formed by diffusing refractive index increasing ions away from a wider waveguide which has been formed previously on the glass substrate by utilizing an ion exchange technique and a positive-type ion exchange mask. The method thereby typically comprises the steps of forming a planar optical waveguide on a glass substrate by the ion exchange technique (with a negative-type ion exchange mask), forming a positive-type ion exchange mask on said planar waveguide, and removing ions which increase the refractive index of the planar waveguide by the ion exchange technique from glass substrate regions having no ion exchange mask. The planar waveguide may cover the whole surface of the substrate.

Figure 1:
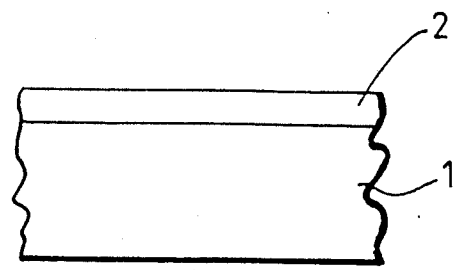
FIGS. 1 to 5 are schematic cross-sectional views of a portion of a glass substrate showing the different steps of the method of the invention.
Figure 2:
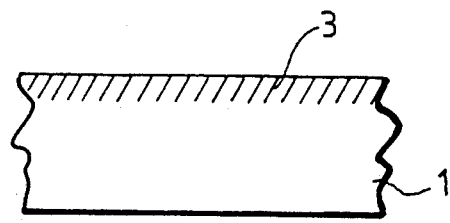
Figure 3:
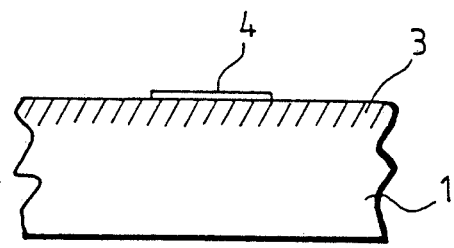
Figure 4:
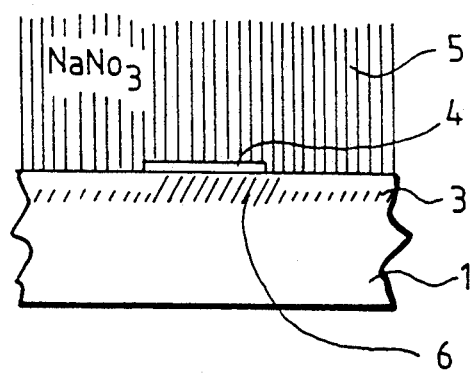

FIG. 1 illustrates the first step of the method of the invention, in which a planar waveguide is formed on a planar glass substrate 1 by introducing refractive index increasing ions to the surface of the glass substrate by using the ion exchange technique. In the preferred embodiment of the invention, this first step utilizes solid-phase silver ion exchange. For this purpose, a thin silver film having a thickness of e.g. about 150 nm is formed by sputtering on the glass substrate 1, such as Corning 0211 glass. A metal film (not shown) is formed on the opposite side of the glass substrate 1, and a voltage, e.g. 50 V, is connected between the silver film 2 and the metal film on the opposite side at an elevated temperature (e.g. 350° C.). $Na^+$ ions thereby start to propagate from the glass substrate 1 to the metal film acting as a cathode, and correspondingly $Ag^+$ ions start to propagate from the silver film 2 to the glass substrate 1, so that a planar optical waveguide 3 having a higher refractive index than that of the surrounding glass is formed on the glass substrate 1. After the formation of the planar waveguide 3, the silver film 2 and the metal film on the opposite side of the substrate 1 are removed, which results in the situation shown in FIG. 2.

Thereafter an ion exchange mask film 4 is formed on the glass substrate 1 upon the planar waveguide 3. The ion exchange mask 4 is of the positive type, that is, it is formed on the substrate 1 at places where the waveguide is to be formed, whereas there is no ion exchange mask film at places where no waveguide is to be formed. Thus the positive-type ion exchange mask pattern 4 corresponds to a desired optical waveguide pattern. The ion exchange mask film can be made e.g. of titanium (Ti).

Figure 5:
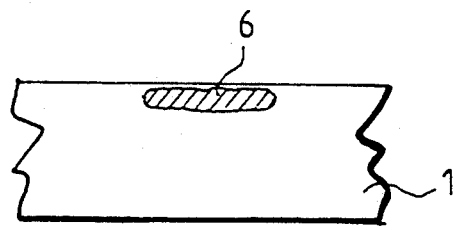

Thereafter the glass substrate 1 provided with the ion exchange mask 4 is subjected to ion exchange in a $NaNO_3$ melt 5. $Na^+$ ions thereby propagate from the melt 5 to the surface layer of the glass substrate 1 and to the planar optical waveguide 3. Correspondingly, refractive index increasing ions, such as $Ag^+$ ions, propagate from the surface of the glass substrate 1 and the waveguide 3 into the $NaNO_3$-melt 5. The ion exchange takes place only within glass substrate surface regions where there is no ion exchange mask 4. No ion exchange takes place through the ion exchange mask 4, so that a waveguide channel 6 is formed under the ion exchange mask 4. After the ion exchange is completed within regions having no ion exchange mask 4, the glass substrate 1 is removed from the salt melt 5 and the ion exchange mask 4 is removed, so that the glass substrate now has the desired optical waveguide channel 6, as shown in FIG. 5.

The attached figures and the description related to them are only intended to illustrate the present invention. In its details, the method of the invention may vary within the scope of the attached claims. For instance, the composition of the ion sources, the glass substrate and the ion exchange masks may vary according to the requirements in each particular application.

We claim:
1. A method of producing an optical waveguide including a patterned light channel comprising:
   providing a glass substrate having a first refractive index,
   diffusing first ions into a surface of said substrate for producing a planar zone at said surface having a second refractive index greater than said first refractive index,
   forming an ion diffusion mask on said substrate surface overlying said zone, said mask having a shape corresponding to a desired light channel in said substrate,
   diffusing said first ions from portions of said zone not covered by said mask outwardly from said substrate, and removing said mask.

2. A method according to claim 1 wherein one of a salt melt and a silver film is used as an ion source for producing said planar zone.

3. Method according to claim 1, wherein the planar zone covers substantially the whole surface of the substrate.

4. A method according to claim 1 wherein said outward diffusion of said first ions is performed in an ion exchange process using a $NaNO_3$ melt placed in contact with said planar zone for providing a source of second ions exchanged with said first ions during said outward diffusion.

5. Method according to claim 1, wherein the ion mask is made by sputtering from titanium.

* * * * *